United States Patent
Szylakowski et al.

(10) Patent No.: US 9,715,954 B2
(45) Date of Patent: Jul. 25, 2017

(54) CABLES HAVING A CONDUCTIVE COMPOSITE CORE AND METHODS OF FORMING THE SAME

(71) Applicant: GENERAL CABLE TECHNOLOGIES CORPORATION, Highland Heights, KY (US)

(72) Inventors: Gregg R. Szylakowski, Loveland, OH (US); Nicholas John Duer, Highland Heights, KY (US); Maisha Makeda Cox, Erlanger, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 15/092,098

(22) Filed: Apr. 6, 2016

(65) Prior Publication Data
US 2016/0293299 A1    Oct. 6, 2016

Related U.S. Application Data

(60) Provisional application No. 62/143,469, filed on Apr. 6, 2015.

(51) Int. Cl.

| | | |
|---|---|---|
| H01B 13/24 | (2006.01) |
| H01B 13/14 | (2006.01) |
| B29C 47/00 | (2006.01) |
| B29B 11/04 | (2006.01) |
| B29C 47/02 | (2006.01) |
| B29C 47/06 | (2006.01) |
| H01B 1/24 | (2006.01) |
| H01B 7/28 | (2006.01) |
| H01B 7/00 | (2006.01) |
| B29L 31/34 | (2006.01) |
| B29K 105/20 | (2006.01) |
| B29K 707/04 | (2006.01) |
| B29K 709/08 | (2006.01) |

(52) U.S. Cl.
CPC .............. *H01B 13/24* (2013.01); *B29B 11/04* (2013.01); *B29C 47/0016* (2013.01); *B29C 47/02* (2013.01); *B29C 47/06* (2013.01); *H01B 1/24* (2013.01); *H01B 7/0063* (2013.01); *H01B 7/2806* (2013.01); *H01B 13/145* (2013.01); *B29C 47/0052* (2013.01); *B29C 47/025* (2013.01); *B29C 47/027* (2013.01); *B29K 2105/20* (2013.01); *B29K 2707/04* (2013.01); *B29K 2709/08* (2013.01); *B29K 2995/0005* (2013.01); *B29K 2995/0007* (2013.01); *B29L 2031/3462* (2013.01)

(58) Field of Classification Search
USPC ....................................... 428/113; 174/120 R
See application file for complete search history.

(56) References Cited

U.S. PATENT DOCUMENTS

| | | |
|---|---|---|
| 3,492,622 A | 1/1970 | Hayashi et al. |
| 4,970,488 A | 11/1990 | Horiike et al. |
| 4,998,090 A | 3/1991 | Park |

(Continued)

*Primary Examiner* — Krystal Robinson
(74) *Attorney, Agent, or Firm* — Ulmer & Berne LLP

(57) ABSTRACT

A cable including a conductive composite core formed from braided carbonized fibers and fiberglass fibers. At least a portion of the fiberglass fibers are coated with magnetic material to suppress electromagnetic interference noise. Methods of forming such cables is also provided herein.

19 Claims, 2 Drawing Sheets

(56) References Cited

U.S. PATENT DOCUMENTS

| | | | |
|---|---|---|---|
| 5,057,812 A | 10/1991 | Yukawa et al. | |
| 5,576,514 A | 11/1996 | Fujimoto et al. | |
| 5,661,266 A | 8/1997 | Chang | |
| 5,824,958 A | 10/1998 | Higashikozono et al. | |
| 6,362,418 B1* | 3/2002 | Grandy | B60R 16/0207 174/120 R |
| 6,492,588 B1* | 12/2002 | Grandy | B60R 16/0207 174/120 R |
| 7,148,422 B2 | 12/2006 | Hopper | |
| 7,282,639 B2 | 10/2007 | Farmer | |
| 7,459,628 B2 | 12/2008 | Farmer | |
| 7,665,451 B2 | 2/2010 | Lam | |
| 7,819,109 B2 | 10/2010 | Lam | |
| 2003/0032560 A1* | 2/2003 | Otto | H01L 39/143 505/100 |
| 2006/0000633 A1* | 1/2006 | Hopper | H01B 7/0063 174/120 R |
| 2007/0235012 A1 | 10/2007 | Lam | |
| 2009/0283513 A1* | 11/2009 | Whitney | H05B 6/56 219/549 |
| 2012/0145700 A1* | 6/2012 | Tsai | H05B 3/145 219/549 |
| 2013/0287346 A1* | 10/2013 | Gimblet | G02B 6/4495 385/100 |

\* cited by examiner

CABLES HAVING A CONDUCTIVE COMPOSITE CORE AND METHODS OF FORMING THE SAME

REFERENCE TO RELATED APPLICATIONS

The present application claims the priority of U.S. Provisional Application Ser. No. 62/143,469, entitled CABLES HAVING A CONDUCTIVE COMPOSITE CORE AND METHODS OF FORMING THE SAME, filed Apr. 6, 2015, and hereby incorporates the same application herein.

TECHNICAL FIELD

The present disclosure relates to cables that include a conductive composite core. The conductive composite core includes braids of carbonized fiber and fiberglass.

BACKGROUND

Engines utilize high-tension engine ignition cables to connect an engine's ignition coils and spark plugs. The high-tension ignition cables conduct high voltages (e.g., up to 50,000 volts or more) to the spark plug and are designed to minimize electromagnetic interference ("EMI") noise. Conventional ignition cables are constructed having a non-conductive core, a metallic wire wound around the core, and a surrounding layer of ferrite to suppress EMI noise. However, such conventional ignition cables suffer from a number of drawbacks. For example, the metal wire used in a conventional high-tension cable is both heavy and susceptible to corrosion which can jeopardize the cable's electro-conductive properties and operation of the engine. Additionally, conventional cables are relatively stiff and expensive to manufacture because of the required materials and the labor necessary to produce a multi-layered wound cable. Accordingly, there is a need for an improved cable that is less expensive to manufacture while having superior properties including improved corrosion resistance, increased flexibility, and decreased weight.

SUMMARY

According to one embodiment, a cable includes a conductive composite core. The conductive composite core includes one or more carbonized fibers and one or more fiberglass fibers. The one or more carbonized fibers and the one or more fiberglass fibers are braided together.

According to another embodiment, a cable includes a conductive composite core. The conductive composite core includes one or more carbonized fibers, one or more fiberglass fibers, and one or more coating layers. The one or more coating layers include a magnetic material and each of the one or more coating layers surrounds one of the fiberglass fibers. The one or more carbonized fibers and the one or more fiberglass fibers are braided together. The cable exhibits an electrical resistance of about 25 ohm/foot to about 5,000 ohm/foot.

According to another embodiment, a method of forming a cable includes braiding one or more carbonized fibers with one or more fiberglass fibers to form a conductive composite core, applying an adhesive to the conductive composite core, extruding an insulation layer around the conductive composite core and adhesive, and extruding a jacket layer around the insulation layer. The conductive composite core has an electrical resistance of about 25 ohm/foot to about 5,000 ohm/foot.

DETAILED DESCRIPTION

Figure 1:
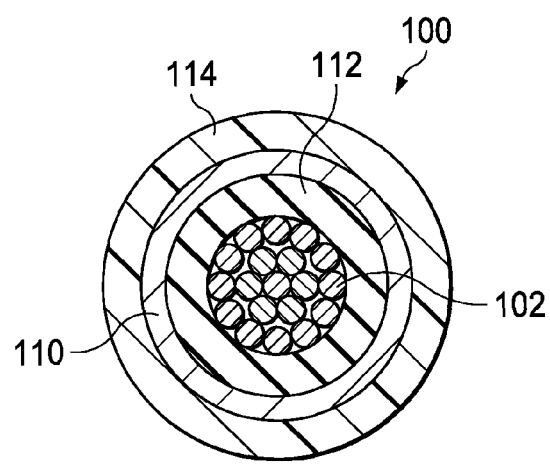
FIG. 1 depicts a cross-sectional end view of an ignition cable according to one embodiment.

As disclosed herein, a composite core cable with improved properties can be constructed without the use of a metal conductor. The composite core cable can generally include a conductive composite core formed from carbonized fibers and fiberglass fibers and can exhibit a number of benefits over conventional ignition cables including increased flexibility, increased corrosion resistance, and decreased weight and cost.

In certain embodiments, a composite conductive core of a cable can include one or more non-metallic carbonized fibers and a plurality of fiberglass fibers. As can be appreciated, the carbonized fibers can be conductive and can have electrical resistance values suitable for high-tension ignition cables. As such, the use of a conductive carbon fiber can eliminate the need to use a relatively expensive and dense metal in certain cables (e.g., high-tension cables). Additionally, carbonized fibers generally exhibit high tensile strength and tensile modulus properties and, as such, can withstand high applied forces, such as bending motions, without failing or breaking.

According to certain embodiments, any carbonized fiber can generally be suitable for inclusion in a composite core cable including carbonized fibers formed from polyacrylonitrile, rayon, petroleum pitch, coal tar, and other synthetic fibers. For example, according to certain embodiments, the carbonized fibers can formed from graphite or carbon fiber filaments. Suitable carbonized fibers can have desired thicknesses to balance strength, electrical resistance, and weight.

In certain embodiments, individual carbonized fibers can also be stranded together to form discrete strands, or plys, of carbonized fiber. As can be appreciated, stranding of the carbonized fibers together can allow for a number of benefits including the ability to easily create a conductive connection with a spark plug or ignition coil, and can also provide for improved mechanical strength. Additionally, the use of discrete strands of carbonized fiber can allow the electrical resistance of cables to be easily adjusted.

Fiberglass fibers can be included in the composite conductive core to improve various properties of the composite cable. For example, fiberglass fibers can be used to provide reinforcement to the composite conductive core and can also, when suitably modified, provide EMI noise suppression. The high malleability of fiberglass fibers can also enhance the flexibility and durability of high-tension cables. Generally, any conventionally known fiberglass can be suitable for inclusion in a conductive composite core. Similar to the carbonized fibers, the fiberglass fibers can also be similarly stranded into discrete strands, or plys, of fiberglass material in certain embodiments. In such embodiments, the strands of carbonized fiber and the strands of fiberglass fiber can generally be of similar size.

In certain embodiments, all of, or a subset of, the fiberglass fibers can be modified to provide EMI noise suppression to a high-tension cable. In such embodiments, the modified fiberglass fibers can be coated with a suitable magnetic material to suppress the EMI noise created by high voltages conducted through a composite core cable. For example, in certain embodiments, a ferrite-containing composition can be applied to one or more fiberglass strands that are to be modified into EMI noise suppressing fiberglass strands. As can be appreciated, ferrite is an inherently magnetic material primarily made of oxidized iron that has strong magnetic properties which can suppress EMI noise. As will be appreciated, other suitable magnetic materials can also be used to provide desired EMI noise suppression.

As can be appreciated, magnetic materials can be applied to fiberglass fibers in any suitable fashion and can be, for example, coated onto the fiberglass fibers from a polymeric coating composition containing dispersed magnetic materials, submerged in a coating composition, adhesively applied, sprayed on, or be incorporated directly into the fiberglass. As can be appreciated, in certain embodiments, similar techniques can also, or alternatively, be used to apply magnetic materials to individual fiberglass fibers and/or strands of fiberglass. In certain embodiments, substantially none of the fiberglass fibers or strands can be coated with a magnetic material; in certain embodiments, about 10% to about 99% of the fiberglass fibers or strands can be coated with a magnetic material; in certain embodiments, about 33% to about 66% of the fiberglass fibers or strands can be coated with a magnetic material; and in certain embodiments, substantially all of the fiberglass fibers or strands can be coated with a magnetic material. Generally, the number of fiberglass fibers or stands to be coated can vary depending on the amount of EMI noise generated by the cable. The remainder of the fiberglass can be left unmodified and can be used to provide, for example, structural strength to the conductive composite core. In certain embodiments, the coating layer formed on the modified fiberglass strands including the magnetic material can have a thickness of about 0.001 inches to about 0.01 inches.

In certain embodiments, individual carbonized fibers or strands and individual fiberglass fibers or strands can be braided together to form a conductive composite core. The relative quantities of the carbonized fibers and the fiberglass fibers can vary. For example, a ratio can be used between the number of carbonized fibers and the number of fiberglass fibers. In such embodiments, certain ratios such as 1 carbonized fiber to 8 fiberglass fibers can be utilized. According to certain embodiments, suitable ratios can vary from a ratio of 1 carbonized fiber to 1 fiberglass fiber to a ratio of 1 carbonized fiber to 32 fiberglass fibers. As can be appreciated, the ratio can be selected based on a variety of factors including the desired electrical resistance of the composite core cable, the requisite EMI noise suppression, and cost. Similar ratios apply with respect to strands of carbonized fibers and stands of fiberglass. In such ratios, the quantity of fiberglass strands can include the modified, EMI noise suppressing, fiberglass strands.

The electrical resistance levels of a composite core cable can vary and can have values from about 25 ohm/foot to about 5,000 ohm/foot; and in certain embodiments, the electrical resistance levels can be from about 50 ohm/foot to about 750 ohm/foot. As can be appreciated, different engines can require cables having different resistance levels. For example, high-performing engines, such as those in luxury sports cars, can require high-tension ignition cables with lower electrical resistance values in order to provide higher voltages.

Advantageously, the composite core cables of the present disclosure can be particularly amenable to the selection and modification of an electrical resistance value. For example, the electrical resistance of a composite core cable can be lowered by increasing the quantity of carbonized fibers, or the number of carbonized fiber strands, in the conductive composite core. Other adjustments are further possible however. For example, the electrical resistance can also be adjusted by altering the path length and/or the spacing of the carbonized fibers in a conductive composite core's braid. As can be appreciated, adjustment of the length of the carbonized fibers by, for example, varying the braid angle, the electrical resistance of the composite core cable can be varied by increasing or decreasing the effective length of the carbonized fiber. For example, a relatively long path length can be achieved by braiding a carbonized fiber (or a strand of carbonized fibers) at a relatively sharp angle. Braiding at a sharp angle causes the carbonized fiber to have relatively more transverse reciprocations, and thus a greater length, than a carbonized fiber braided at a wide angle that more directly traverses the length of the cable. A greater path length will increase the resistance of the composite core cable. In certain embodiments, the path length can be described by reference to the spacing between consecutive twists of the carbonized fiber in the braided core. In such embodiments, the distance along the longitudinal length of the braid between consecutive twists of carbonized fibers can be from about 1 mm to about 10 mm. As can be appreciated, a combination of the above methods can be used to quickly and efficiently adapt the presently disclosed composite core cables for specific applications and engines. For example, a cable for a sports car can be produced by selecting a relatively large number of carbonized fibers and then further adjusted by selecting a braid angle for the carbonized fibers. As can be appreciated, the ability to modify the resistance value of a cable can be particularly advantageous as it allows for a single supply of materials to be quickly adapted for particular electrical resistance values with little overhead or retooling.

The cables of the present disclosure can have a variety of benefits compared to wire wound ignition cables. For example, the use of composite materials can result in cables that are about 10% to about 15% lighter than conventional wire wound ignition cables of similar resistance and EMI noise suppression. Additionally, because the mass of an individual carbonized fiber strand or fiberglass strands is relatively small, modification of the disclosed composite core cables for specific electrical resistance values has little effect on the mass of the cable in contrast to prior designs. As can be appreciated, reductions in weight can allow for easier manufacturing, transportation and installation. The use of composite material can also allow for an increased lifespan and improved engine performance because the conductive carbonized fibers are not susceptible to corrosion over time.

Composite core cables can also be more flexible than traditional metallic wire-wound cores as a result of using non-brittle fiberglass and carbonized materials. As can be appreciated, flexibility can be important for ignition cables because of the need to bend such cables during installation. If a core is not flexible, the cable can crack and malfunction.

In certain embodiments, composite core cables can include additional components. For example, in certain embodiments, the conductive composite core can further include an adhesive to reduce flaring of the carbon fiber and fiberglass during manufacturing and assembly. As can be appreciated, the use of an adhesive can prevent individual fibers from coming loose (flaring) from the braid during normal operation or manufacture by adhering the fibers to other portions of the conductive composite core. Generally, any type of adhesive can be used that does not damage the fiberglass strands or carbonized fibers. For example, in certain embodiments, a suitable hot-melt adhesive can be used including a thermoset adhesive such as an adhesive epoxy or a thermoplastic adhesive.

An adhesive can be applied in any of several ways including, for example, as an extrusion around each of, or some of, the carbonized or fiberglass fibers or strands, as an extrusion around the braided conductive core, or by introducing strips of adhesive during the braiding process that can then be melted during the braiding process. In certain embodiments using a hot-melt adhesive, the melting point temperature of the hot-melt adhesive can be selected to be higher than any other components in the composite core cable. For example, in certain embodiments including an insulation layer, the melting point temperature of a hot-melt adhesive can be higher than the melting point of an insulation layer to prevent re-melting of the adhesive when the insulation layer is applied. As can be appreciated, the use of relatively little adhesive can prevent flaring of the individual fibers. For example, in certain embodiments, about 0.1% to about 1% of a composite core cable, by weight, can be an adhesive.

In certain embodiments, a composite core cable can further include other components. For example, a high-tension cable can include one or more insulation layers, shield layers, and jacket layers.

An insulation layer can generally be formed from any suitable material that provides desired insulation properties, dielectric properties, as well as adequate resistance to various environmental conditions such as heat and vibration. For example, in certain embodiments, the insulation layer can be formed from one, or more, polymers such as a polyolefin or ethylene propylene rubber and can be thermoplastic or thermoset. Such insulation layers can vary in size depending on various factors such as the electrical resistance of the cable as well as the durability and flexibility of the cable. Insulation layers can generally be applied around the conductive composite core through, for example, an extrusion process. One skilled in the art will appreciate that other suitable materials and constructions could also be used to form an insulation layer.

In certain embodiments, an ignition cable can also include a shield layer to further suppress EMI noise. Generally, any known shield layer can be used. For example, in certain embodiments, a braided metallic shield layer can be utilized. As can be appreciated, braided metallic shields can provide excellent EMI noise suppression while maintaining flexibility. An example of a braided shielded layer is disclosed in U.S. Patent App. Publication No. 2013/0299211 which is hereby incorporated by reference. Other suitable shield layers can include discontinuous cross block tape shields and thermoset semi-conducting polymer layers. Discontinuous cross block tape shields can include a thin discontinuous metallic layer to suppress EMI noise. Likewise, semi-conductive polymer layers can incorporate conductive fillers such as, carbon black, graphite, or metallic particles into a polymer matrix to provide EMI noise suppression.

In certain embodiments, a protective jacket can be used to enclose and protect all of the underlying components of the composite core cable. Protective jackets suitable for use in ignition cables are well known and can be formed from, for example, thermoplastic or cross-linked polyolefins including, ethylene-containing polymers such as polyethylene (including low-density polyethylene (LDPE), high-density, high molecular weight polyethylene (HDPE), ultra-high molecular weight polyethylene (UHDPE), linear-low-density polyethylene (LLDPE), and very-low density polyethylene), ethylene vinyl acetate, as well as polypropylene, maleated polypropylene, polybutylene, polyhexalene, polyoctene, and copolymers, mixtures, or blends thereof.

Figure 2:
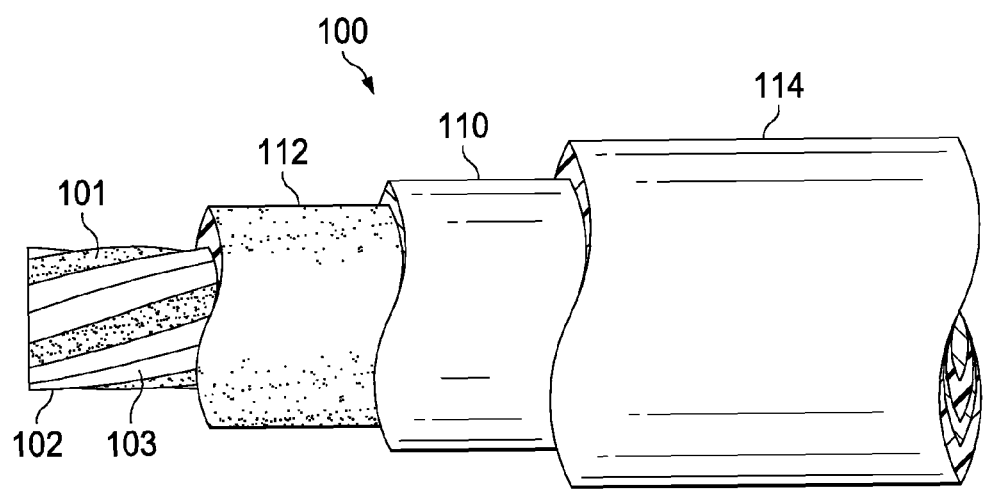
FIG. 2 depicts a cut-away side view of the cable depicted in FIG. 1.
Figure 3:
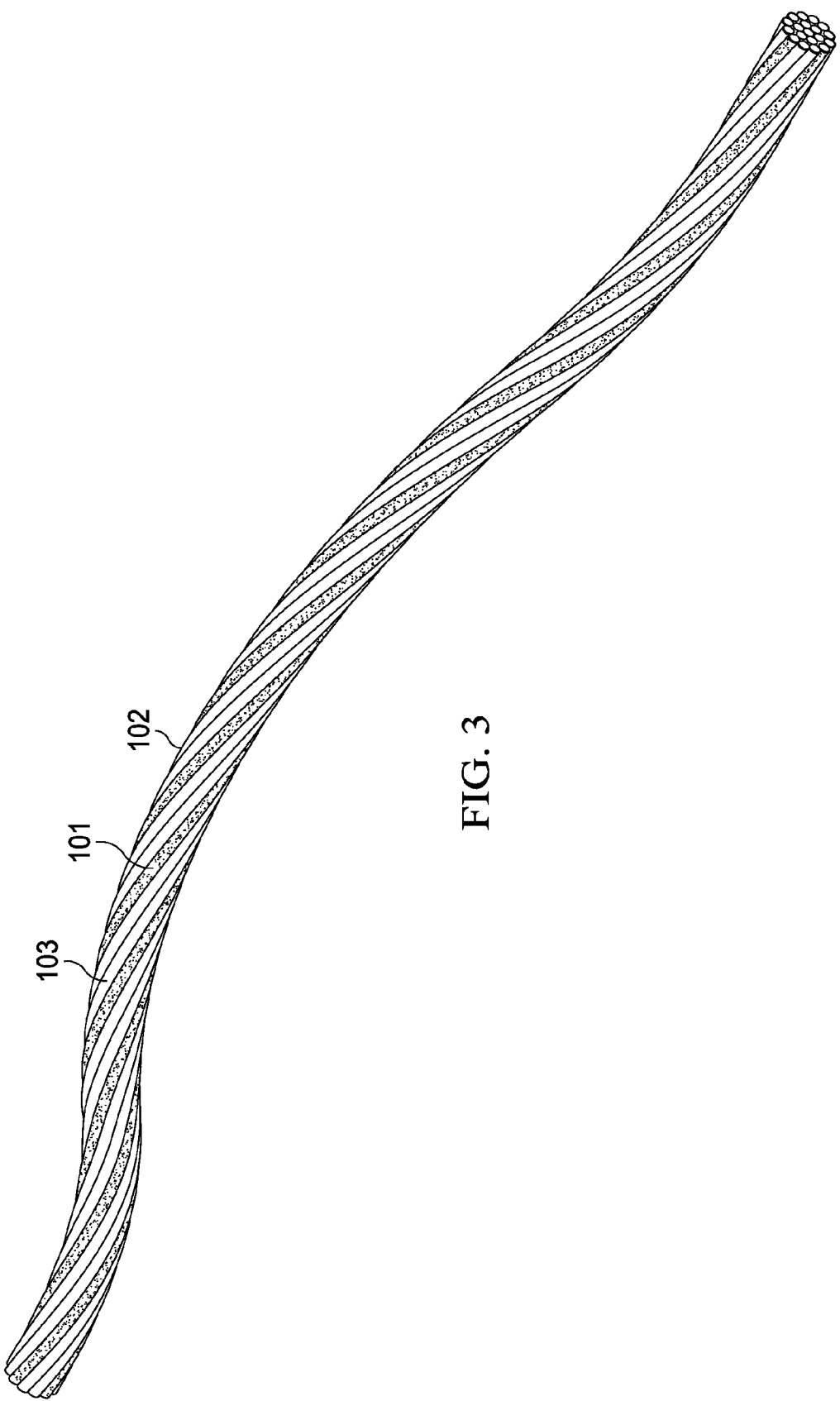
FIG. 3 depicts a perspective view of a composite core according to one embodiment.

Illustrative drawings of a composite core cable are depicted in FIGS. 1-3. As depicted in the illustrative embodiments, a composite core cable 100 can include a conductive core 102, an insulation layer 112, a shield layer 110, and a protective jacket 114. The conductive core 102 can be formed of strands of carbonized fibers 101 and strands of fiberglass fibers 103.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising:
   a conductive composite core comprising one or more carbonized fibers and one or more fiberglass fibers; and
   one or more coating layers, wherein each of the one or more coating layers surrounds one of the one or more fiberglass fibers and each of the one or more coating layers comprises a magnetic material;
   wherein the one or more carbonized fibers and the one or more fiberglass fibers are braided together.

2. The cable of claim 1, wherein the magnetic material comprises ferrite.

3. The cable of claim 1, wherein about 10% or more of the one or more fiberglass fibers are coated with one of the one or more coating layers.

4. The cable of claim 1, wherein about 30% or more of the one or more fiberglass fibers are coated with one of the one or more coating layers.

5. The cable of claim 1, wherein each of the one or more coating layers has a thickness of about 0.001 inches to about 0.01 inches.

6. The cable of claim 1, wherein the ratio of carbonized fibers to fiberglass fibers is about 1:1 to about 1:32.

7. The cable of claim 1, wherein the conductive composite core when braided comprises consecutive loops of the one or more carbonized fiber strands, such that the distance between the loops is about 1 mm to about 10 mm.

8. The cable of claim 1, further comprising a hot melt adhesive surrounding the conductive core.

9. The cable of claim 1 exhibits an electrical resistance of about 25 ohm/foot to about 5,000 ohm/foot.

10. The cable of claim 1 exhibits an electrical resistance of about 50 ohm/foot to about 750 ohm/foot.

11. The cable of claim 1, further comprising an insulation layer surrounding the conductive composite core.

12. The cable of claim 11, further comprising a shield surrounding the insulation layer.

13. The cable of claim 12, wherein the shield comprises a braided metallic shield.

14. The cable of claim 11, further comprising a protective jacket surrounding the insulation layer.

15. The cable of claim 1 is a high-tension cable.

16. An automobile comprising an internal combustion engine and one or more high-tension cables of claim 15.

17. A cable comprising a conductive composite core, the conductive composite core comprising:
one or more carbonized fibers;
one or more fiberglass fibers; and
one or more coating layers comprising a magnetic material, wherein each of the one or more coating layers surrounds one of the one or more fiberglass fibers;
wherein the ratio of carbonized fibers to fiberglass fibers is about 1:8;
wherein the one or more carbonized fibers and the one or more fiberglass fibers are braided together; and
wherein the cable exhibits an electrical resistance of about 25 ohm/foot to about 5,000 ohm/foot.

18. A method of forming a cable, the method comprising:
braiding one or more carbonized fibers with one or more fiberglass fibers to form a conductive composite core; wherein the conductive composite core has an electrical resistance of about 25 ohm/foot to about 5,000 ohm/foot; and wherein the conductive composite core further comprises one or more coating layers, wherein each of the one or more coating layers surrounds one of the one or more fiberglass fibers and each of the one or more coating layers comprises a magnetic material;
applying an adhesive to the conductive composite core;
extruding an insulation layer around the conductive composite core and adhesive; and
extruding a jacket layer around the insulation layer.

19. The method of claim 18, wherein braiding the one or more carbonized fibers with the one or more fiberglass fibers further comprises determining a path length and a braid angle for each of the one or more carbonized fibers.

* * * * *